Nov. 21, 1933.  L. PAYNE ET AL  1,935,951
RAISIN TREATING METHOD AND APPARATUS
Filed Dec. 23, 1931   7 Sheets-Sheet 1

INVENTORS
LEROY PAYNE
THOMAS W. W. FORREST
BY
ATTORNEYS.

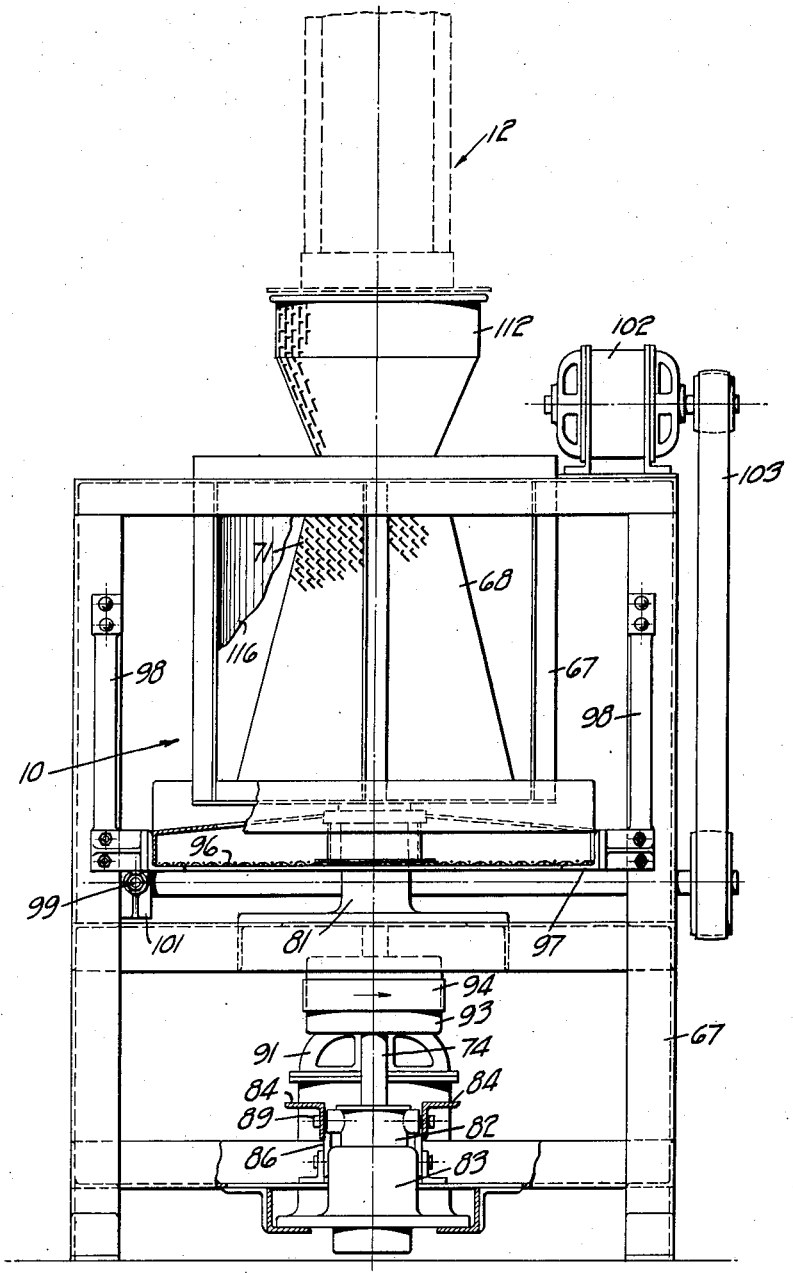

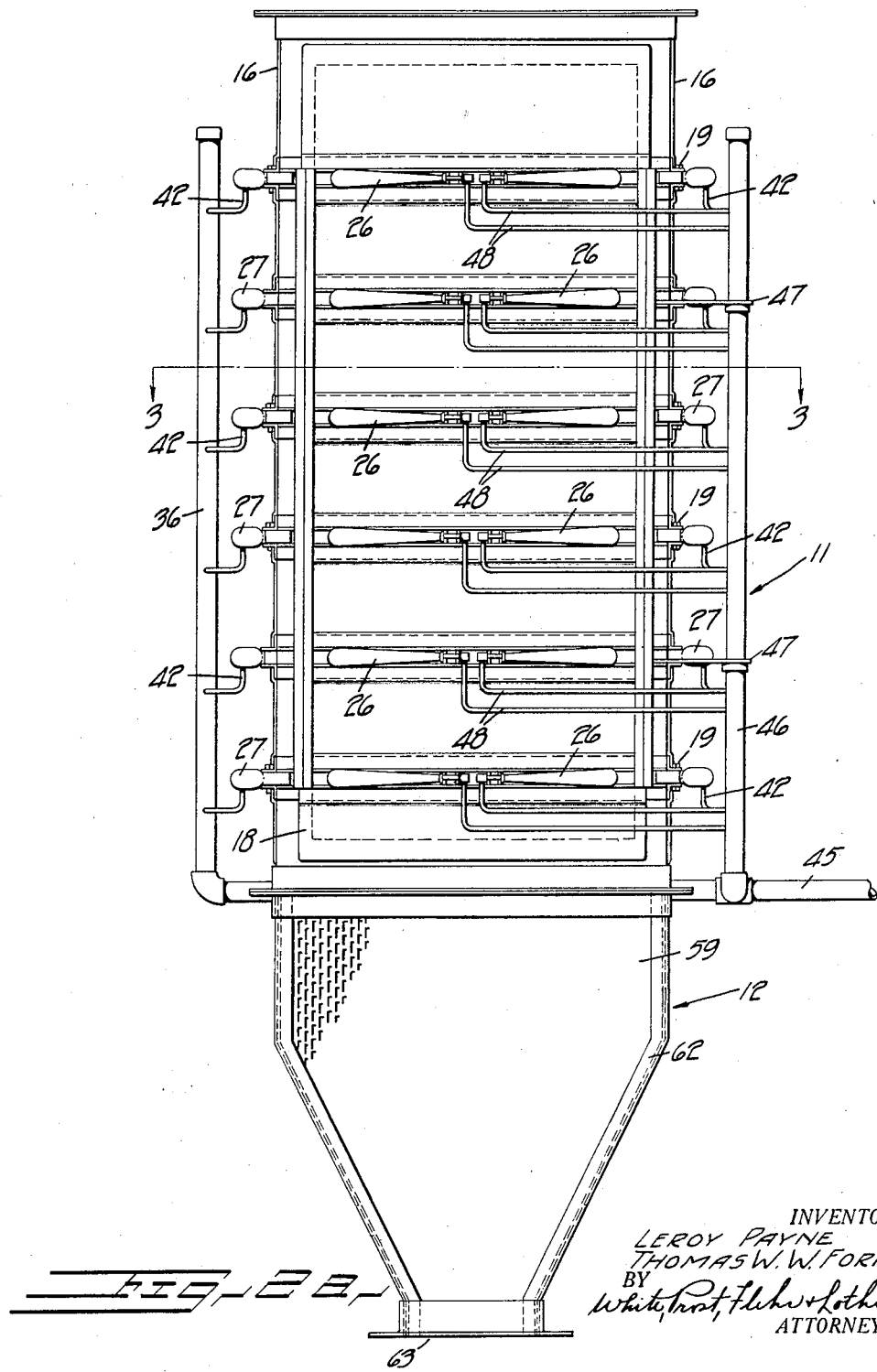

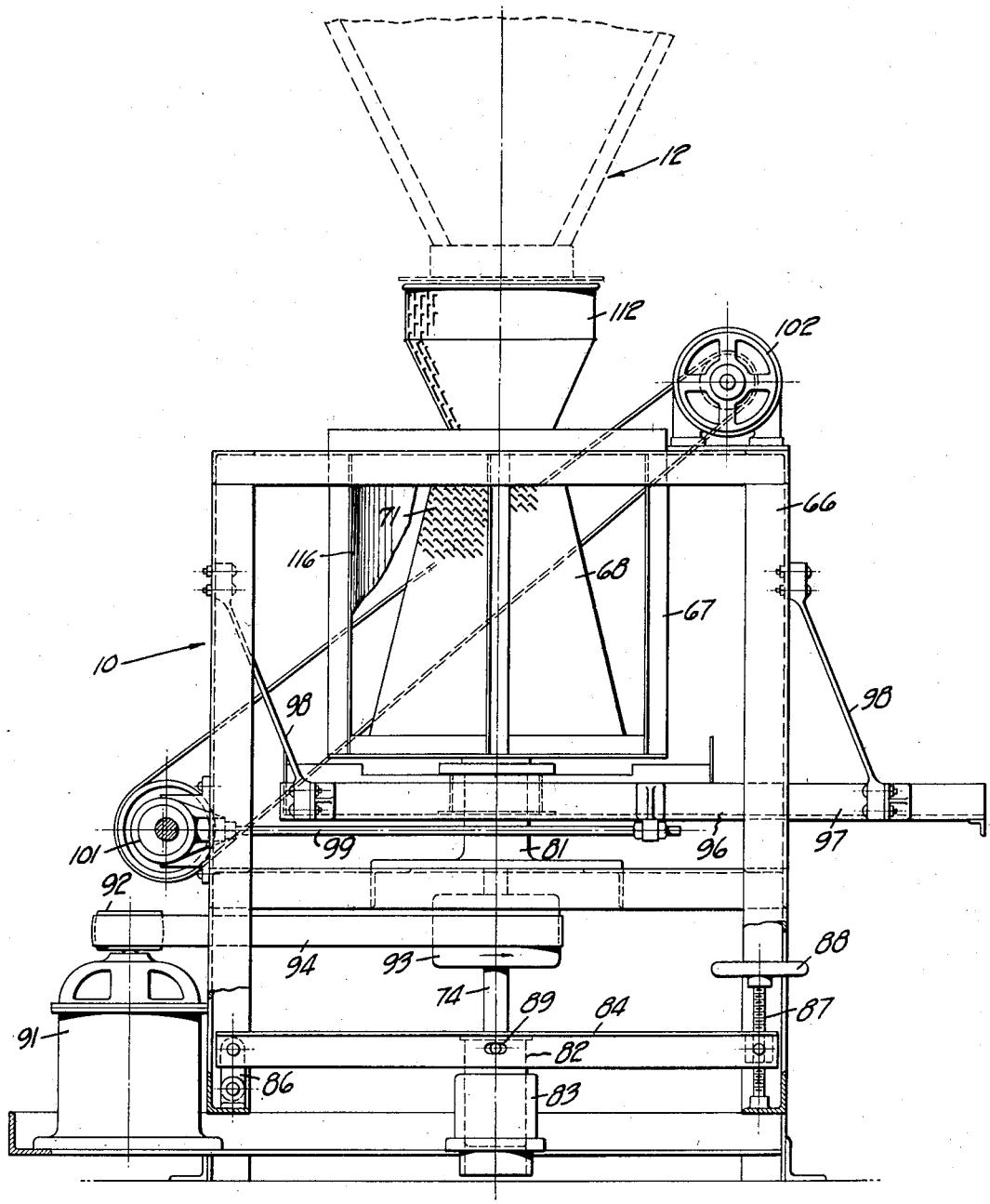

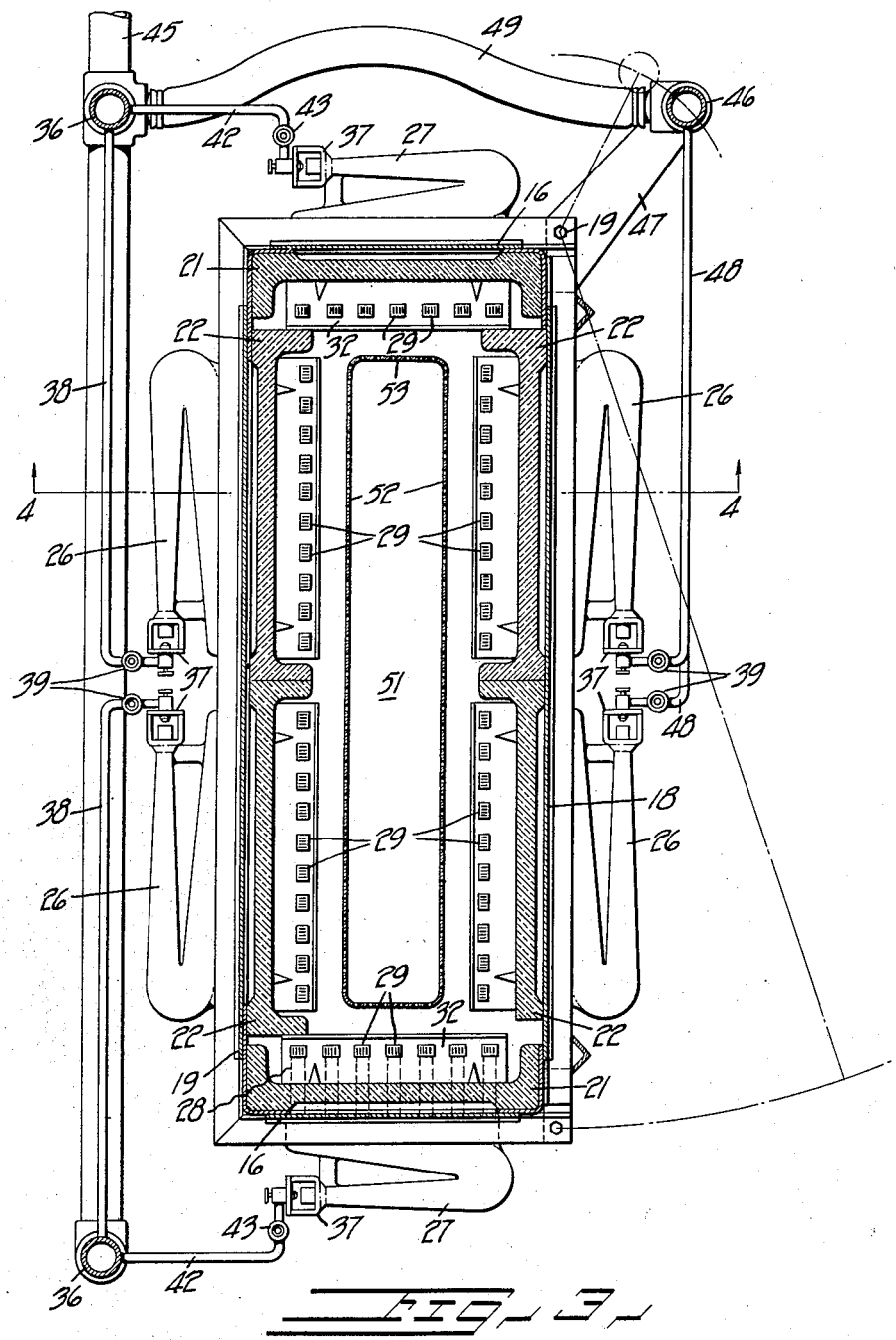

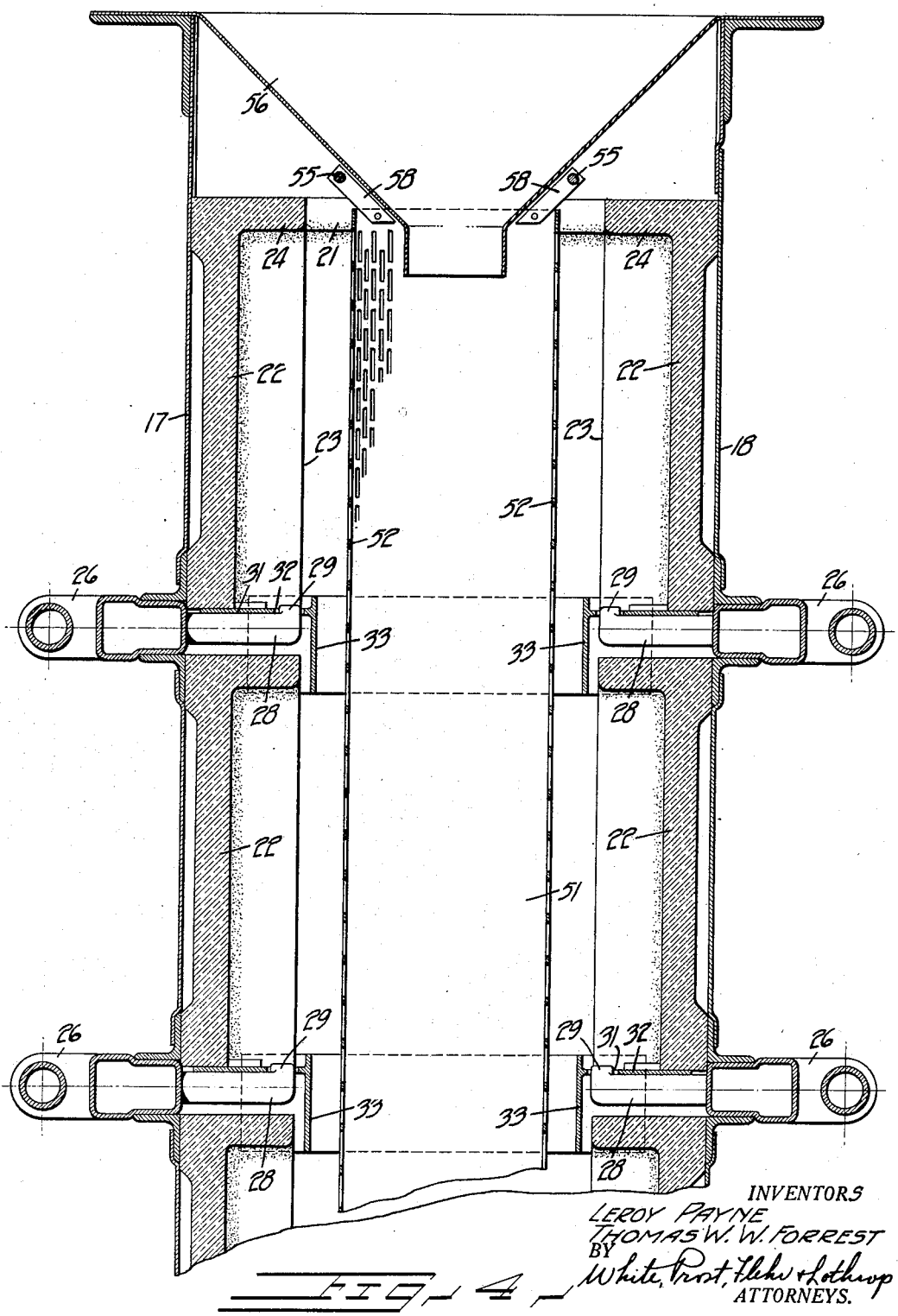

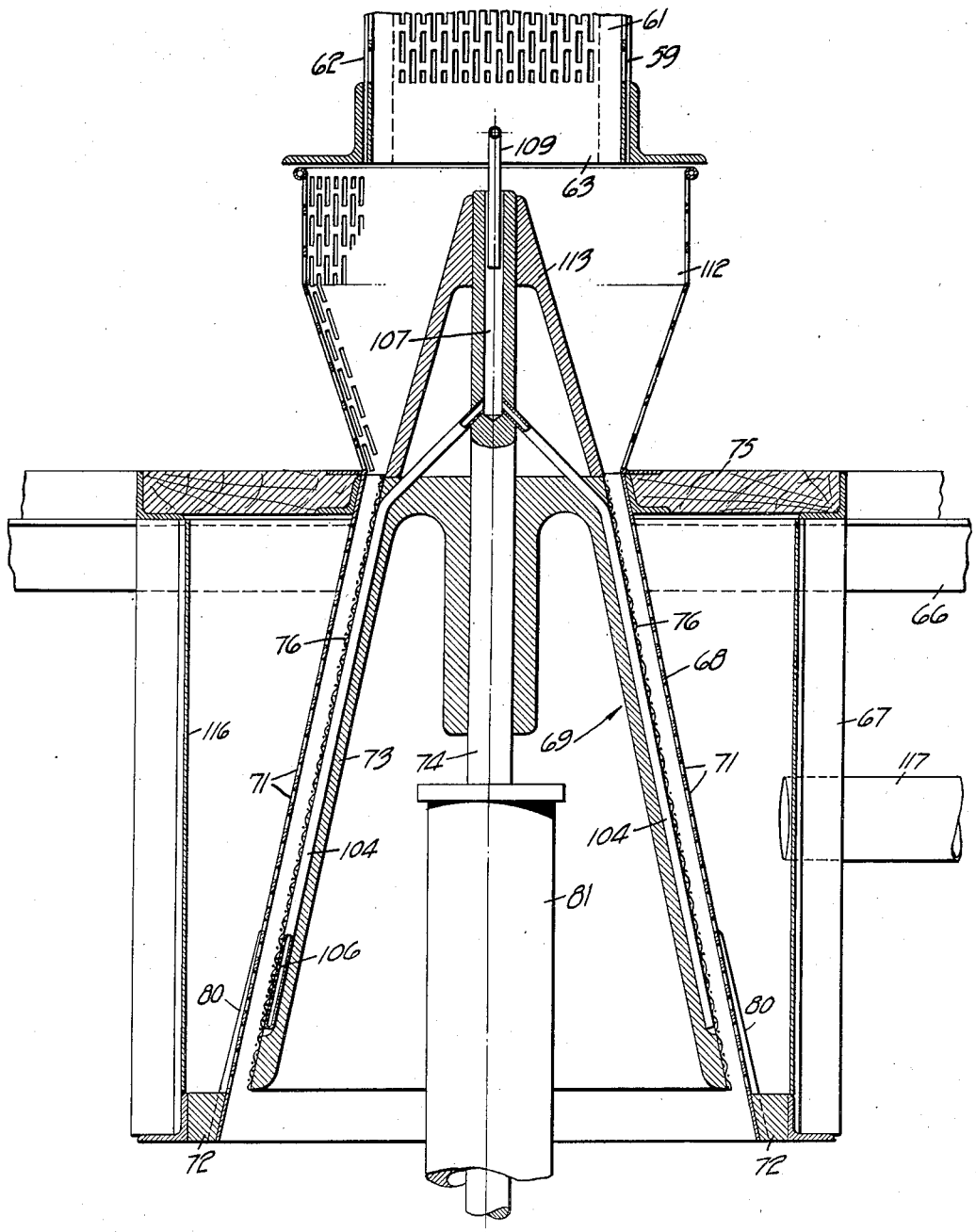

Patented Nov. 21, 1933

1,935,951

UNITED STATES PATENT OFFICE 1,935,951

RAISIN TREATING METHOD AND APPARATUS

Leroy Payne and Thomas W. W. Forrest, San Francisco, Calif.

Application December 23, 1931
Serial No. 582,718

6 Claims. (Cl. 146—55)

This invention relates generally to methods and apparatus for treatment of fruits like raisins, to place the raisins in marketable condition.

In the raisin industry, as it has been practiced in the United States, it has been common to subject raisins to an elaborate treatment in order to place the same in a desired marketable condition. One step of this treatment has been to effect a cap stemming operation, to remove the stems from the raisins. The machines utilized for cap stemming tend to mutilate the raisins, and breakage of the skin with resultant exclusion of juice is common. To minimize such mutilation it has been common to subject the raisins to a preliminary drying operation in which the raisins are dehydrated to a substantial degree. When such drying is employed, the raisins are dehydrated to such an extent that after being passed through the cap stemming machines, moisture should be reintroduced to make up for a portion of the loss in weight.

Many objections to prior methods outlined above are evident. In addition to the fact that the drying operation requires elaborate machinery, this operation requires a relatively long time for its completion, a drying period of from eight to twelve hours being common. Therefore, such methods materially increase the cost of the product to the consumer. A further disadvantage is that the physical and chemical properties of the raisins are deleteriously affected by such treatment. The extended drying, which is carried out at a temperature of about 155° F., results in a product of permanently darkened color, and the flavor of the resultant product is not as pleasing as the product resulting from our method and apparatus. The natural sugar content of the raisins is also permanently changed, which is probably responsible for the change in flavor. A further disadvantage is that there is frequently a permanent loss in weight, as compared to the product resulting from our method and apparatus.

It is an object of the present invention to devise an improved method and apparatus for the treatment of fruits like raisins, which obviates the disadvantages of prior methods such as outlined above. In this connection, the invention is characterized by the absence of a long drying period prior to effecting cap stemming of the raisins, and by the fact that the natural color, softness and palatability of the raisins is retained.

Another object of the invention is to devise a novel method and apparatus which will effect cap stemming of the raisins without material mutilation.

Further objects of the invention will appear upon the following description in which the preferred embodiment of our invention has been set forth in detail in conjunction with the accompanying drawings. It is to be understood that the appended claims are to be accorded a range of equivalents consistent with the state of the prior art.

Referring to the drawings:

Figures 1a and 1b are end elevational views illustrating a machine incorporating the present invention. Figure 1a illustrates the upper portion of the machine, while Figure 1b illustrates the lower portion.

Figures 2a and 2b, taken together, constitute a side view of the machine illustrated in Figures 1a and 1b.

Figure 3 is a cross sectional detail taken along the line 3—3 of Figure 2a.

Figure 4 is a cross sectional detail taken along the line 4—4 of Figure 3.

Figure 5 is a side elevational detail, in transverse cross section, illustrating details of the cap stemmer which we prefer to employ.

Figure 1A:
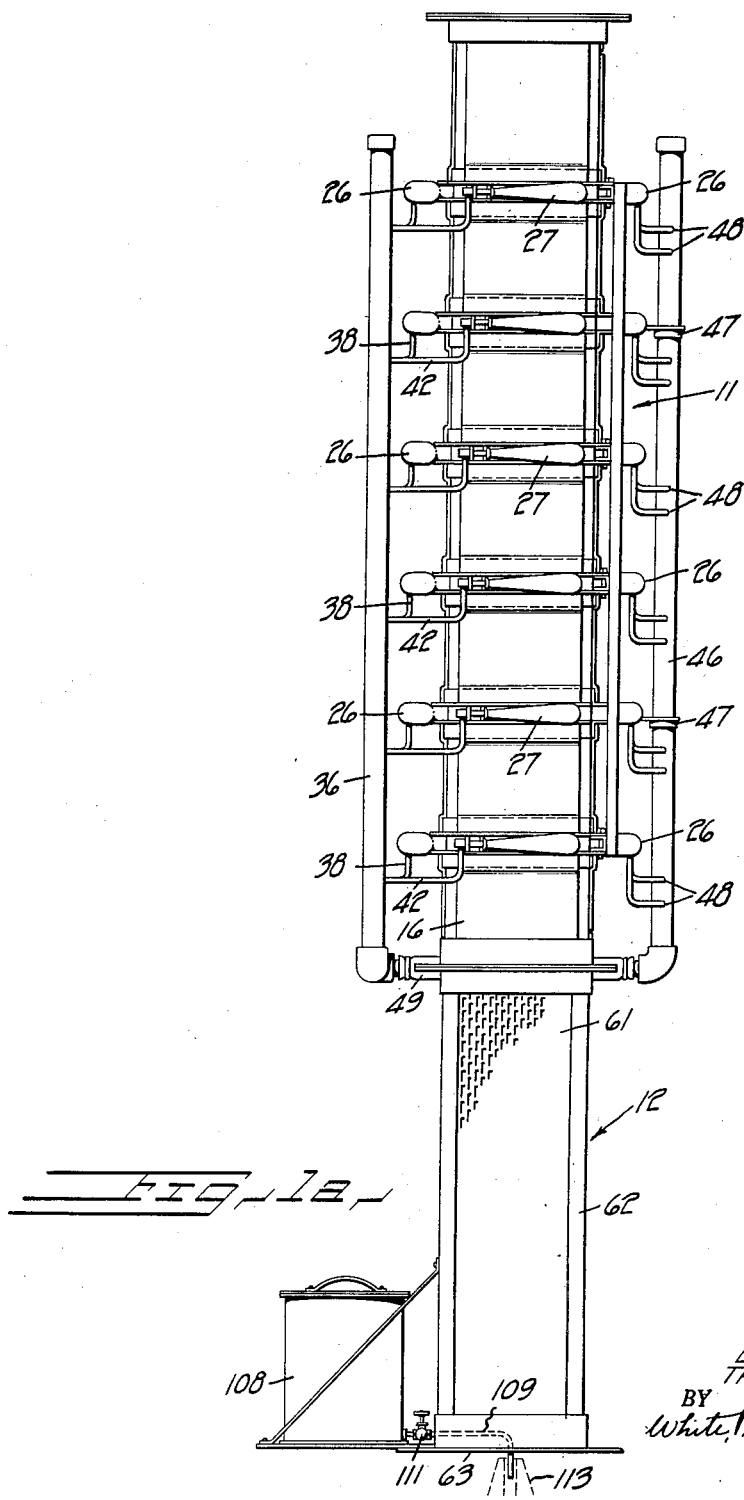

The method of the present invention can best be understood by a detailed description of the apparatus illustrated in the drawings. Referring to Figures 1a and 1b, this apparatus consists generally of a lower cap stemmer 10, an upper heating section 11, and an intermediate cooling section 12. Before explaining in detail the construction of these parts, it may be explained that the raisins are introduced into the top of the heater section 11, and are permitted to pass downwardly through this section and through the intermediate cooling section 12, and into the cap stemmer 10. While passing through section 11 the raisins are heated to a relatively high temperature, and subsequently while passing through section 12 they are cooled rapidly, so as to condition the raisins for the cap stemming operation.

A desirable construction for the heating section 11 can be described with reference to Figures 1a, 2a, 3 and 4. As illustrated in these figures, it consists of an upright housing formed of suitable material such as sheet metal, and including end walls 16, a side wall 17 secured to end walls 16, and an opposite side wall 18 which is secured to the remainder of the housing by hinge connections 19, as shown in Figure 3. Lining the inner walls of this housing are a plurality of refractory elements 21 and 22. From Figs. 3 and 4 it will be seen that refractory elements 22 are provided with upstanding and lateral flanges 23 and 24. Similar flanges are provided for refractory elements 21, these elements for convenience being dimensioned smaller than elements 22. Exterior of the housing and adjacent to the side walls 17 and 18, are gas manifolds 26, similar manifolds 27 are positioned adjacent the end walls 16. A horizontal row of burner pipes 28 extends into the housing from each manifold 26 and these pipes are provided with upwardly directed flame tips 29 arranged to direct gas flames within the pocket or recess formed between the flanges 23 and 24 of each refractory element 22. Each row of flame tips 29 is shown projecting through apertures 31 provided in a plate 32, this plate being positioned to overlie the burner pipes 28. The inner edge of each plate 32 is connected with an upright plate 33, depending below the pipes 28. By such an arrangement, secondary air may flow upwardly through the apertures 31 and around tips 29, to afford efficient combustion. Similar burner pipes are connected to manifolds 27 to produce gas flames adjacent the inner faces of refractory elements 21.

Any suitable arrangement can be utilized for supplying gas to the manifolds 26 and 27. Thus, in Figs. 2a and 3 we have shown upright header pipes 36 connected to a gas supply pipe 38. Each manifold is provided with a suitable air mixing head 37. Pipes 38, provided with individual valves 39, connect between manifolds 26 at one side of the housing, and header pipes 36. Pipes 42 provided with individual valves 43, likewise connect between headers 36 and manifolds 27. For connecting with the manifold 26 at the other side of the housing, there is shown an upright header pipe 46 journaled to brackets 47. Pipes 48, likewise provided with individual valves 39, connect between the manifolds 26 at that side of the housing, and header 46. Header 46 is shown connected with pipe 45 by a flexible hose 49.

It may be explained at this point that the manifolds 26 at one side of the housing, together with their associates burner pipes and refractory elements 22, are assembled as a unit with side wall 18, and therefore this assembly can be swung outwardly in its entirety about hinge connection 19. The journaled header pipe 46, together with flexible hose connection 49, permits such swinging movement without disrupting communication with the gas supply pipe 37. It will be apparent that the hinging of side wall 18 facilitates ignition of the gas within the housing, and also facilitates making repairs or replacements within the housing.

Extending downwardly through the center of the heater section 11, there is an elongated passage 51 defined by foraminous side and end baffle walls 52 and 53 which can be conveniently formed of slotted sheet metal. These walls 52 and 53 are spaced with respect to refractory elements 21 and 22, so as to be out of direct contact with the gas flames, but the perforations or slots in the same permit hot products of combustion to enter passage 52 and also causes only a portion of the radiated heat from the gas flames and from the heated refractory elements 21 and 22, to be intercepted. Raisins dropped down through passage 51, are therefore heated both by contact with hot gases, and by direct absorption of heat of radiation.

To facilitate introduction of raisins into the upper end of passage 51, a hopper or funnel 56 is mounted in the upper end of the housing, and the lower discharge end 57 of this funnel is disposed between the upper ends of foraminous walls 52 and 53. The lower end of passage 51 discharges into the upper end of cooling section 12, which will be presently explained. Foraminous walls 52 and 53 can be conveniently supported in any suitable manner, as for example, by upper brackets 58 (Fig. 4) connected to the end walls 52 and engaging rods 55 which extend through the heater section 11 and are supported by the end walls 16.

Cooling section 12 is relatively simple in construction and consists merely of foraminous side and end walls 59 and 61, which are connected together by the corner angle members 62. The lower discharge end 63 of this section delivers raisins to the cap stemming apparatus 10, while the upper end is connected to the lower end of heating section 11 and serves to receive the raisins dropped downwardly through passage 51. The foraminous character of walls 59 and 61 permits inflow of relatively cool atmospheric air into the interior of this section, and permits flow of air from this section into the upper heating section 11. Therefore as raisins pass downwardly through the intermediate section 12, they are contacted with relatively cool atmospheric air to effect relatively rapid cooling. Cooling is preferably accelerated by a forced blast of air flowing upwardly from the cap stemming apparatus as will be presently explained.

Details of the cap stemmer can best be described by reference to Figs. 2b and 5. This apparatus consists of a main frame 66, which serves to support an inner sub-frame 67. Carried within sub-frame 67, there is a stationary conical shaped part 68, and a rotatable conical shaped part 69. Part 68 is foraminous, in that it is formed of relatively thin sheet metal provided with inclined slots 71, as shown in Figure 2b. The upper end of the stationary part 68 projects through an opening provided in a platform 75, this platform being removably supported by the main frame 66. The lower end of part 68 is held in proper axial alignment by blocks 72 which abut against the sub-frame 67. The lower portion of sheet metal part 69 is preferably corrugated, as indicated at 80, to secure more effective action upon the raisins as will be presently explained.

The inner rotatable part 69 of the cap stemming apparatus consists of a body 73 provided with a conical shaped peripheral surface, and mounted axially upon a rotatable vertical shaft 74. Fixed to and covering the outer conical periphery of body 73, there is a surfacing of metal screening 76. Note that screening 76 is spaced vertically with respect to the inner surface of the outer conical shaped part 68.

As will be presently explained, it is desirable to permit vertical adjusting movement of the inner rotatable part 69 of the cap stemmer. Such vertical movements are made possible by a special form of bearings for shaft 74. Thus, within the body 73 of the rotatable part 69, shaft 74 is provided with a journal 81, in which shaft 74 can be adjusted vertically. Journal 81 is suitably supported by the main frame 67. The lower portion of shaft 74 is also journaled within a suitable thrust bearing block 82, which is vertically adjustable within a guide 83. Guide 83 is likewise secured to the main frame 67 (Fig. 1b). Extending horizontally upon opposite sides of the thrust block 82 are the levers 84, corresponding ends of which are secured to the frame 67 by links 86. The other corresponding ends of levers 84 are connected to a common cross-head, which is provided with a nut threaded upon screw 87. Screw 87 is mounted upon frame 67 and can be turned to any desired adjusted position by the hand wheel 88. A pin and slot connection 89 connects the intermediate portions of levers 84 with the bearing block 82. By turning hand wheel 88 thrust bearing block 82, and thus shaft 74, can be adjusted vertically within certain limits.

As representative of suitable means for driving shaft 74 at a relatively high rate of speed, as for example about 1200 R. P. M., there is shown an electric motor 91 mounted upon frame 67, and provided with a drive pulley 92. Pulley 92 is connected to a pulley 93 fixed to shaft 74, by a drive belt 94.

In order to tend to retard the downward rate of flow of raisins through the cap stemmer, we preferably cause a draft of air to flow upwardly between the outer and inner parts 68 and 69. This can be accomplished by enclosing the sides of sub-frame 67 with walls 116. A stream of air is introduced into this enclosure, as by means of conduit 117. This air flows through the slots in part 68 and is delivered upwardly through platform 75. Such an air draft not only retards progression of raisins through the cap stemmer, but also tends to aid in effecting cooling of the raisins, before the cap stemming operation is commenced.

Immediately below the conical point 69, a horizontal screen 96 is provided for receiving the raisins, this screen being supported by a suitable frame 97. Frame 97 is supported by resilient members 98 and is adapted to be vibrated by suitable means, such as an eccentric rod 99 and eccentric 101. Eccentric 101 is shown driven by an electric motor 102, through the belt drive 103. Screen 96 is of such a mesh that it will pass the stems, and it is so arranged that when vibrated the raisins are continuously moved toward one side of frame 67 where they are discharged.

In order to enable operation at relatively high capacity, without undue wear upon the thin metal part 68 or screen 76, we preferably introduce small quantities of atomized oil into the cap stemming apparatus, during its operation. Thus, as shown in Figure 5, the conical shaped body 73 is recessed to accommodate longitudinal tubes 104, which are provided with apertures 106 for the discharge of oil through screening 76. At their upper ends, tubes 104 are connected to a passageway 107 formed axially of shaft 74. As representative of suitable means for effecting introduction of a controlled quantity of oil into passageway 107, there is shown a reservoir 108 mounted upon the lower portion of the intermediate cooling section 12 (Figure 1a). A pipe 109 leading from the lower portion of reservoir 108, discharges in the passageway 107, and the rate of flow of oil can be controlled by valve 111. Oil introduced from reservoir 108 is discharged by centrifugal force through apertures 106, and by virtue of its velocity and also by virtue of the fact that the oil must pass through screen 76, a finely atomized mist is provided for effectively maintaining an oil film upon part 68. The amount of oil utilized is preferably insufficient to appreciably coat the raisins.

As shown in Figure 5, in order to introduce the raisins from the cooling section 12 into the cap stemmer, a foraminous walled hopper 112 extends upwardly from the stationary conical part 68, and terminates adjacent the lower end 63 of the cooling section 12. A conical shaped cap 113 is also positioned upon the upper end of body 69, so as to guide the raisins into the space between this body and the stationary conical part 68.

Operation of our complete apparatus can be described as follows:

Assuming that the burners of the upper heater section 11 are ignited, raisins to be treated are poured into the funnel or hopper 56 and are permitted to drop by gravity down through the vertical passage 51. As the raisins fall through this passage they are subjected to a relatively high temperature, for a relatively short period of time. Good results are secured by having the interior of passage 51 register a temperature of about 2000° F. Obviously, such a relatively high temperature would cause cooking of the raisins and evaporation of considerable moisture if the treatment were prolonged for any considerable period. However, the relatively short period of this treatment in this heating section, merely affects the outer surface of the raisins and does not cause any appreciable cooking or dehydration of the flesh. In this connection, note that the period of treatment is determined primarily by the height of passage 51 within the heating section 11. In practice, with the temperature indicated, good results have been secured by utilizing a height of approximately eight feet. Likewise, in connection with rapid heating of the raisins, it should also be noted that the cross section contour of passage 51, as shown in Figure 3, has a major dimension many times greater than the minor dimension. This is for the purpose of effecting more uniform and efficient distribution of heat to all of the raisins as they drop through the heater section.

The burning of gas within the heating section causes an appreciable upward draft of air into the lower portion of this section, this air being drawn through the foraminous walls of the intermediate cooler section 12. Therefore, as the raisins are received within this intermediate section, they are contacted with air currents at atmospheric temperature, and also with upward currents of air from the cap stemmer, and are cooled at a relatively rapid rate.

As the raisins are received in the cap stemmer, they will whirl about in the space between the stationary conical part 68, and the rotary screen 76. Repeated impact of the raisins upon the inner surface of stationary part 68, and the surface of rotary screen 76, which is accompanied by considerable friction or abrasion and a rolling or turning movement of the raisins, causes the stems of the raisins to be removed. The raisins, together with the removed stems, gradually progress downwardly until they are received upon the shaker screen 96. A final abrasion is effected by the lower corrugated portion of part 68, which tends to reduce the velocity of the raisins. The removed stems including those discharged though slots 71, pass through screen 86, while the stemmed raisins are delivered from the end of this screen. The vertical position of rotary part 69 should be adjusted to secure proper cap stemming of the particular character of raisins being handled.

The rapid heating of the raisins, followed by relatively rapid cooling, accomplishes at least two desirable objects. It causes the stems of the raisins to become relatively brittle so they are more readily removed by the cap stemming apparatus, and it also so conditions the raisins that they are not multilated by the mechanical treatment utilized for the removal of the stems. This conditioning is not permanent, in that if instead of introducing the raisins immediately into the cap stemmer, they were stored for a considerable time, the conditioning would vanish, thus indicating that the conditioning is at least in part due to inequalities in temperature.

As is evident from the preceding description, this treatment prior to cap stemming does not require a long period of time, and does not require elaborate equipment as compared to equipment utilized in prior methods. The natural color, natural sugar content, softness, palatability and flavor of the raisins is retained in the final product. Furthermore, there is a saving in weight estimated as being from say six percent to ten percent over prior methods.

It is characteristic of our cap stemming apparatus that the slots in the thin sheet metal parts 68 will not become clogged through accumulation of stems, foreign particles and fruit juices. Prior cap stemmers have been characterized by clogging, necessitating frequent cleaning and low capacity operation. The non-clogging feature of our cap stemmer is due to several factors, as for example the use of thin slotted metal for part 68, in place of a screen, the inclination of slots 71 in the direction of rotation of the inner part 69, and the maintenance of an oil film. The elimination of clogging makes possible operation at relatively high capacity. The use of small amounts of oil minimizes wear upon part 68 and thus makes possible the use of thin sheet metal. In this connection note that the oil should not be such as would deleteriously affect the raisins.

As has been previously explained, we prefer to utilize our method and apparatus without a preliminary drying or dehydration of the raisins. It is obvious, however, that our method and apparatus can be used to effect a modification of present methods, by first drying the raisins for a period of say two hours, followed by treatment by our method and apparatus. Partial drying for such a period as compared to drying for a period of eight hours, as has been practiced in the past, will not result in serious detriment to the finished product.

We claim:

1. In a method of treating fruits like raisins comprising subjecting the raisins to a relatively high temperature for an insufficient amount of time to effect substantially drying, then contacting the raisins with a relatively cool air, and mechanically cap stemming the raisins.

2. In a method of treating fruits like raisins, the steps of subjecting the raisins to a relatively high temperature as exemplified by 2000° F., for an amount of time insufficient to effect substantial drying, then contacting the raisins with relatively cool gas as exemplified by air at atmospheric temperatures, and mechanically cap stemming the raisins.

3. A method of treating fruits like raisins, comprising causing the raisins to flow by gravity through two successive zones of treatment, in the first of which the raisins are subjected to a relatively high temperature for an amount of time insufficient to effect substantial drying of the flesh, and in the second zone of which the raisins are contacted with a relatively cool gas, whereby the raisins are conditioned for cap stemming.

4. In apparatus of the character described for treating fruits like raisins, means for heating the raisins to a relatively high temperature without effecting substantial drying of the flesh of the raisins, means for effecting relatively rapid cooling of the raisins after being treated by said first named means, and mechanical means for effecting removal of the stems from the raisins so treated.

5. In apparatus of the character described for treating fruits like raisins, a structure forming a relatively upright passage through which the raisins can be dropped by gravity, means for maintaining a relatively high temperature gaseous atmosphere within said passage, means for subjecting the raisins discharged from said passage to currents of relatively cool air, and means for effecting mechanical cap stemming of the raisins so treated.

6. In a method of treating fruits like raisins, the steps of subjecting the raisins to a relatively high temperature for an insufficient amount of time to effect substantial drying, the temperature being sufficiently high to cause drying and burning of the raisins if prolonged, and then cap stemming the raisins by subjecting the same to impacts and surface friction.

LEROY PAYNE.
THOMAS W. W. FORREST.